United States Patent [19]
James

[11] Patent Number: 5,007,363
[45] Date of Patent: Apr. 16, 1991

[54] GUNNEL SAVER DOCK AND MOORING FENDER

[76] Inventor: Roy James, R.D. 1-Box 92, Smyrna, Del. 19977

[21] Appl. No.: 386,216

[22] Filed: Jul. 26, 1989

[51] Int. Cl.⁵ .............................................. E02B 3/22
[52] U.S. Cl. .................................... 114/219; 405/212
[58] Field of Search ................ 114/219; 267/140, 145; 405/212-215

[56] References Cited

U.S. PATENT DOCUMENTS

| | | | |
|---|---|---|---|
| 2,844,943 | 7/1958 | Kennedy | 405/213 |
| 3,173,270 | 3/1965 | Blancato | 114/219 |
| 3,449,917 | 6/1969 | Roskopf | 114/219 |
| 3,486,342 | 12/1969 | Aks | 405/212 |
| 4,804,296 | 2/1989 | Smath | 405/212 |
| 4,817,552 | 4/1989 | Poldervaart | 114/219 |

FOREIGN PATENT DOCUMENTS 389201 11/1973 U.S.S.R. ............... 114/219

Primary Examiner—Joseph F. Peters, Jr.
Assistant Examiner—Edwin L. Swinehart

[57] ABSTRACT

A buoyant marine fender element is disclosed, with guides for securing it to a mooring facility such as a piling, which allows the fender element to rise and fall with the tide or waves. The fender element is cylindrical in form and sealed at each end by an enlarged end cap, which serves as a stop element for limiting up and down movement upon contacting a guide element.

4 Claims, 1 Drawing Sheet

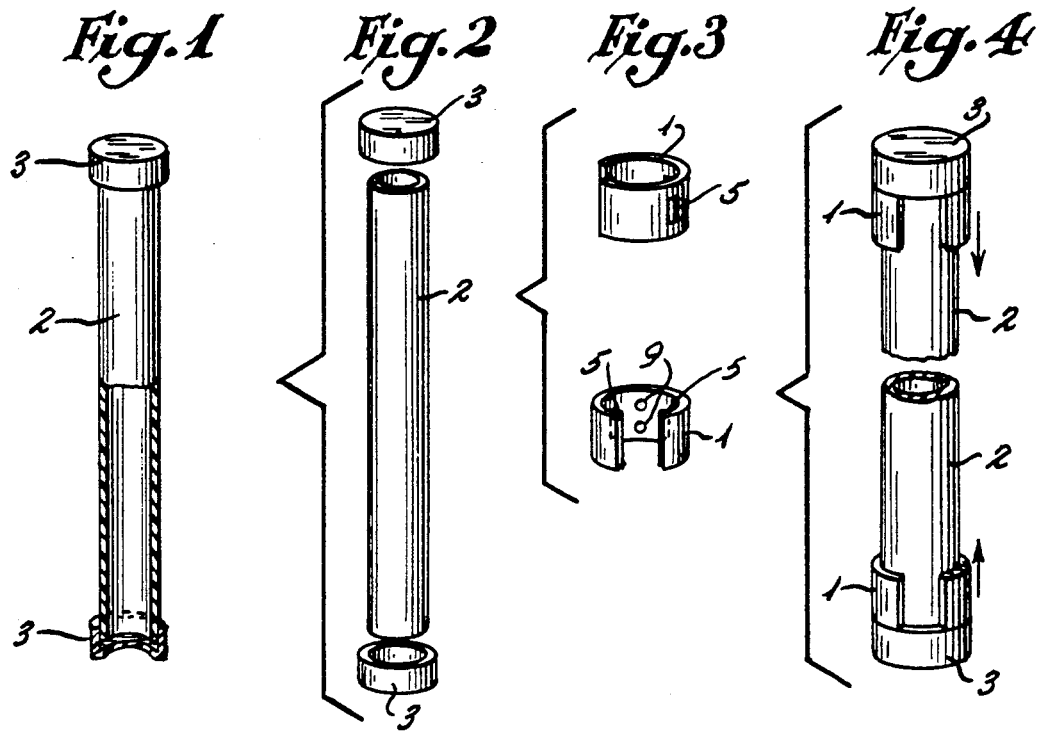
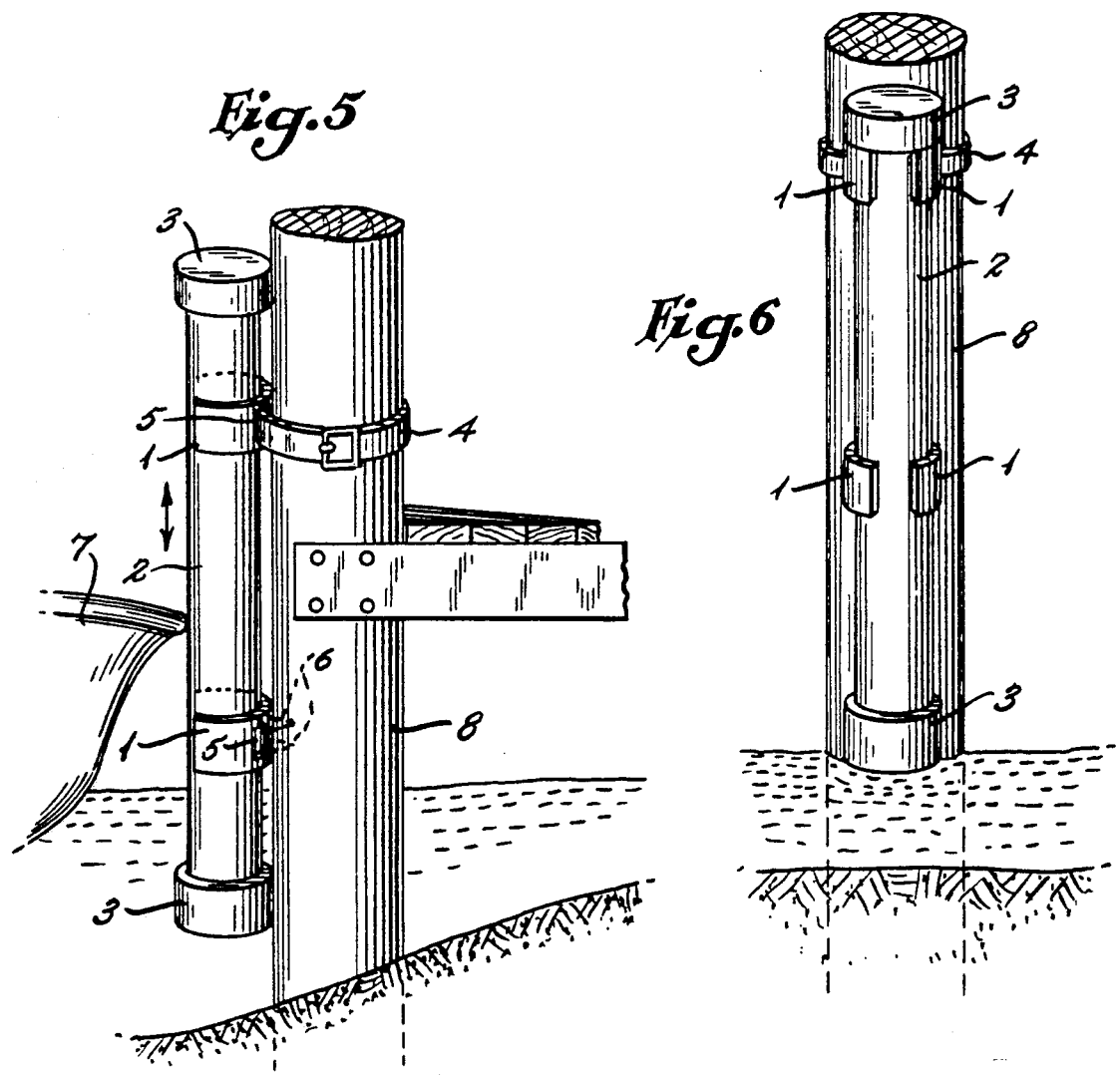

GUNNEL SAVER DOCK AND MOORING FENDER

BACKGROUND OF THE INVENTION

This invention relates to a mooring fender apparatus, particular an apparatus to protect the gunnel and rub rail of a boat, barge, etc., and also the mooring facility on which the gunnel saver is attached.

SUMMARY

The present invention provides a mooring fender which may be left unattended, as it automatically raises and lowers with the tide, and moves up and down as the boat or vessel rocks back and forth, thereby causing no wear on the boat, vessel, gunnel or rub rail.

An object of the invention is the provision of either permanent or temporary fastening to a mooring facility by means or ropes or straps to provide a portable fender apparatus.

Another object of the invention is the provision of a cylindrical fender element, and generally cylindrical guides which are fastened to the mooring facility, the guides allowing the fender element to rise and fall with the tide.

Another object of the invention is the provision of end caps for the cylindrical fender element which act as stop elements which limit the raising and lowering of the fender element as the caps come into contact with the guides.

Another object of the invention, is a fender element which rises and falls automatically, thereby eliminating the need to constantly adjust the tension in the mooring lines as the weather and tides change.

Another object of the invention , is a cylindrical fender element made of any suitable material such as plastic, rubber, wood or PVC pipe, so as to bend or flex as the gunnel or rub rail comes into contact therewith, thereby absorbing shock.

Still another object of the invention is a lightweight and compact fender apparatus which can be mass produced.

Other objects and advantages of the present invention will be apparent from the following description, taken in connection with the accompanying drawings.

BRIEF DESCRIPTION OF THE DRAWINGS

FIG. 1 is a fragmentary view of the fender element with end caps.

FIG. 2 is an exploded view of the fender element with end caps.

FIG. 3 shows perspective views of the guide elements.

FIGS. 4 and 5 show the fender element mounted within the guides upon a mooring facility, and illustrates both permanent and temporary mountings for the guides.

FIG. 6 shows fragmentary views of the fender element with its' end caps engaging the guides, which caps act as stops.

DETAILED DESCRIPTION OF THE DRAWINGS

FIGS. 1 and 2 show the fender element of the present invention which provides an elongated cylindrical tube 2 constructed of for-example PVC pipe. The pipe is closed and sealed at both ends by caps 3 thereby rendering the fender element buoyant.

Generally cylindrical guides 1 are provided and guide the up and down movement of the fender elements. Slots 5 are provided for receiving a strap or rope 4 which facilitates the mounting of the fender element and guides to a mooring facility, such as piling 8, as shown in FIGS. 4 and 5.

Threaded fasteners 6 may be provided in lieu of the straps as shown in FIG. 4, such fasteners extending through a hole or holes 9 as shown in FIG. 3.

In operation, as boat 7 when moored moves up and down with the waves and tide, the bumper element 2 will likewise be moving up and down due to its' buoyancy, thereby reducing wear on the boat.

I claim:

1. A docking and mooring fender apparatus comprising an elongated buoyant cylindrical fender element which has an enlarged stop element at each of its' ends,
   at least one generally cylindrical guide element having attachment means for attachment to a mooring facility,
   said fender element being slidably retained within said at least one guide element so as to be able to rise and fall with tide or waves,
   said enlarged stop elements being adapted to contact said at least one guide element to thereby limit said fender elements extend of travel within said at least one guide element.

2. A docking and mooring fender apparatus as set forth in claim 1 wherein said attachment means comprises threaded fasteners for securement to said mooring facility.

3. A docking and mooring fender apparatus as set forth in claim 1 wherein said attachment means comprises slots in said at least one guide element, and a strap which is adapted to pass through said slots and about said mooring facility.

4. A docking and mooring fender apparatus as set forth in claim 1 wherein said mooring facility is a piling of a dock.

* * * * *